US007424527B2

(12) United States Patent
Petite

(10) Patent No.: US 7,424,527 B2
(45) Date of Patent: *Sep. 9, 2008

(54) SYSTEM AND METHOD FOR TRANSMITTING POLLUTION INFORMATION OVER AN INTEGRATED WIRELESS NETWORK

(75) Inventor: Thomas D. Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 527 days.

This patent is subject to a terminal disclaimer.

(21) Appl. No.: 10/021,100

(22) Filed: Oct. 30, 2001

(65) Prior Publication Data

US 2003/0093484 A1    May 15, 2003

(51) Int. Cl.
  *G06F 15/173* (2006.01)
(52) U.S. Cl. ............ 709/224; 370/230; 340/853.2; 340/853.8; 340/539.22
(58) Field of Classification Search ............ 709/203, 709/224; 370/230; 340/853.3, 853.8, 839.22
See application file for complete search history.

(56) References Cited

U.S. PATENT DOCUMENTS

| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wooten |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |

(Continued)

FOREIGN PATENT DOCUMENTS

EP    0718954    6/1966

(Continued)

OTHER PUBLICATIONS

U.S. Utility Patent Application entitled "System for Monitoring Conditions in a Residential Living Community," U.S. Appl. No. 09/271,517, filed Mar. 18, 1999, consisting of 43 pages, 12 pages of drawings, inventor: Thomas D. Petite.

(Continued)

*Primary Examiner*—Bunjob Jaroenchonwanit
*Assistant Examiner*—Duyen M Doan
(74) *Attorney, Agent, or Firm*—Troutman Sanders LLP; Filip A. Kowalewski; James Hunt Yancey, Jr.

(57) ABSTRACT

A pollution information message system provides a system and method for generating and transmitting pollution information messages. In one embodiment, the pollution information message system employs a transceiver network with a plurality transceivers coupled to monitoring devices. Control room operators receive a pollution information message from an identifiable transceiver. The transceiver, identified by an identification code, indicates a location and the nature of the detected pollution.

24 Claims, 5 Drawing Sheets

U.S. PATENT DOCUMENTS

| | | | |
|---|---|---|---|
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,354,181 A | 10/1982 | Spletzer |
| 4,396,910 A | 8/1983 | Enemark et al. |
| 4,396,915 A | 8/1983 | Farnsworth et al. |
| 4,417,450 A | 11/1983 | Morgan, Jr. et al. |
| 4,436,957 A | 3/1984 | Mazza |
| 4,446,454 A | 5/1984 | Pyle |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,670,739 A | 6/1987 | Kelly, Jr. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,800,543 A | 1/1989 | Lyndon-James et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,918,690 A | 4/1990 | Markkula, Jr. et al. |
| 4,918,995 A | 4/1990 | Pearman et al. |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A * | 11/1990 | Reeser ................. 342/357.09 |
| 4,977,612 A | 12/1990 | Wilson |
| 4,980,907 A | 12/1990 | Raith et al. |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,155,481 A | 10/1992 | Brennan, Jr. et al. |
| 5,159,317 A | 10/1992 | Brav |
| 5,162,776 A | 11/1992 | Bushnell et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Heimkamp et al. |
| 5,265,162 A | 11/1993 | Bush et al. |
| 5,266,782 A | 11/1993 | Alanara et al. |
| 5,272,747 A | 12/1993 | Meads |
| 5,282,204 A | 1/1994 | Shpancer et al. |
| 5,282,250 A | 1/1994 | Dent et al. |
| 5,289,165 A | 2/1994 | Belin |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidwell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,345,231 A | 9/1994 | Koo et al. |
| 5,345,595 A | 9/1994 | Johnson et al. |
| 5,347,263 A | 9/1994 | Carroll et al. |
| 5,354,974 A | 10/1994 | Eisenberg |
| 5,355,278 A | 10/1994 | Hosoi et al. |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,406,619 A | 4/1995 | Akhteruzzman et al. |
| 5,412,192 A | 5/1995 | Hoss |
| 5,412,760 A | 5/1995 | Peitz |
| 5,416,475 A | 5/1995 | Tolbert et al. |
| 5,416,725 A | 5/1995 | Pacheco et al. |
| 5,418,812 A | 5/1995 | Reyes et al. |

| | | | | | |
|---|---|---|---|---|---|
| 5,420,910 A | 5/1995 | Rudokas et al. | 5,636,216 A | 6/1997 | Fox et al. |
| 5,424,708 A | 6/1995 | Ballestry et al. | 5,644,294 A | 7/1997 | Ness |
| 5,432,507 A | 7/1995 | Mussino et al. | 5,655,219 A | 8/1997 | Jusa et al. |
| 5,438,329 A | 8/1995 | Gastouniotis et al. | 5,657,389 A | 8/1997 | Houvener |
| 5,439,414 A | 8/1995 | Jacob | 5,659,300 A | 8/1997 | Dresselhuys et al. |
| 5,442,553 A | 8/1995 | Parrillo | 5,659,303 A | 8/1997 | Adair, Jr. |
| 5,445,287 A | 8/1995 | Center et al. | 5,668,876 A | 9/1997 | Falk et al. |
| 5,451,929 A | 9/1995 | Adelman et al. | 5,673,252 A | 9/1997 | Johnson et al. |
| 5,451,938 A | 9/1995 | Brennan, Jr. | 5,673,304 A | 9/1997 | Connor et al. |
| 5,452,344 A | 9/1995 | Larson | 5,673,305 A | 9/1997 | Ross |
| 5,454,024 A | 9/1995 | Lebowitz | 5,682,139 A | 10/1997 | Pradeep et al. |
| 5,465,401 A | 11/1995 | Thompson | 5,682,476 A | 10/1997 | Tapperson et al. |
| 5,467,074 A | 11/1995 | Pedtke | 5,689,229 A | 11/1997 | Chaco et al. |
| 5,467,082 A | 11/1995 | Sanderson | 5,699,328 A | 12/1997 | Ishizaki et al. |
| 5,467,345 A | 11/1995 | Cutler et al. | 5,701,002 A | 12/1997 | Oishi et al. |
| 5,468,948 A | 11/1995 | Koenck et al. | 5,704,046 A | 12/1997 | Hogan |
| 5,471,201 A | 11/1995 | Cerami et al. | 5,704,517 A | 1/1998 | Lancaster, Jr. |
| 5,473,322 A | 12/1995 | Carney | 5,706,191 A | 1/1998 | Bassett et al. |
| 5,475,689 A | 12/1995 | Kay et al. | 5,706,976 A | 1/1998 | Purkey |
| 5,481,259 A | 1/1996 | Bane | 5,708,223 A | 1/1998 | Wyss |
| 5,481,532 A * | 1/1996 | Hassan et al. ............... 370/312 | 5,708,655 A | 1/1998 | Toth |
| 5,484,997 A | 1/1996 | Haynes | 5,712,619 A | 1/1998 | Simkin |
| 5,488,608 A | 1/1996 | Flammer, III | 5,712,980 A | 1/1998 | Beeler et al. |
| 5,493,273 A | 2/1996 | Smurlo et al. | 5,714,931 A | 2/1998 | Petite et al. |
| 5,493,287 A | 2/1996 | Bane | 5,717,718 A | 2/1998 | Rowsell et al. |
| 5,506,837 A | 4/1996 | Sollner et al. | 5,726,634 A | 3/1998 | Hess et al. |
| 5,509,073 A | 4/1996 | Monnin | 5,726,984 A | 3/1998 | Kubler et al. |
| 5,513,244 A | 4/1996 | Joao et al. | 5,732,074 A | 3/1998 | Spaur et al. |
| 5,515,419 A | 5/1996 | Sheffer | 5,732,078 A | 3/1998 | Arango |
| 5,517,188 A | 5/1996 | Caroll et al. | 5,736,965 A | 4/1998 | Mosebrook et al. |
| 5,522,089 A | 5/1996 | Kikinis et al. | 5,740,232 A | 4/1998 | Pailles et al. |
| 5,528,215 A | 6/1996 | Siu et al. | 5,742,509 A | 4/1998 | Goldberg et al. |
| 5,539,825 A | 7/1996 | Akiyama et al. | 5,745,849 A | 4/1998 | Britton |
| 5,541,938 A | 7/1996 | Di Zenzo et al. | 5,748,104 A | 5/1998 | Argyroudis et al. |
| 5,542,100 A | 7/1996 | Hatakeyama | 5,748,619 A | 5/1998 | Meier |
| 5,544,036 A | 8/1996 | Brown, Jr. et al. | 5,754,111 A | 5/1998 | Garcia |
| 5,544,784 A | 8/1996 | Malaspina | 5,754,227 A | 5/1998 | Fukuoka |
| 5,548,632 A | 8/1996 | Walsh et al. | 5,757,783 A | 5/1998 | Eng et al. |
| 5,550,358 A | 8/1996 | Tait et al. | 5,757,788 A | 5/1998 | Tatsumi et al. |
| 5,550,359 A | 8/1996 | Bennett | 5,761,083 A | 6/1998 | Brown, Jr. et al. |
| 5,550,535 A | 8/1996 | Park | 5,764,742 A | 6/1998 | Howard et al. |
| 5,553,094 A | 9/1996 | Johnson et al. | 5,767,791 A | 6/1998 | Stoop et al. |
| 5,555,258 A | 9/1996 | Snelling et al. | 5,771,274 A | 6/1998 | Harris |
| 5,555,286 A | 9/1996 | Tendler | 5,774,052 A | 6/1998 | Hamm et al. |
| 5,562,537 A | 10/1996 | Zver et al. | 5,781,143 A | 7/1998 | Rossin |
| 5,565,857 A | 10/1996 | Lee | 5,790,644 A | 8/1998 | Kikinis |
| 5,568,535 A | 10/1996 | Sheffer et al. | 5,790,662 A | 8/1998 | Valerij et al. |
| 5,570,084 A | 10/1996 | Ritter et al. | 5,790,938 A | 8/1998 | Talarmo |
| 5,572,438 A | 11/1996 | Ehlers et al. | 5,796,727 A | 8/1998 | Harrison et al. |
| 5,573,181 A | 11/1996 | Ahmed | 5,798,964 A | 8/1998 | Shimizu et al. |
| 5,574,111 A | 11/1996 | Brichta et al. | 5,801,643 A | 9/1998 | Williams et al. |
| 5,583,850 A | 12/1996 | Snodgrass et al. | 5,815,505 A | 9/1998 | Mills |
| 5,587,705 A | 12/1996 | Morris | 5,818,822 A | 10/1998 | Thomas et al. |
| 5,589,878 A | 12/1996 | Cortjens et al. | 5,822,273 A | 10/1998 | Bary et al. |
| 5,590,038 A | 12/1996 | Pitroda | 5,822,544 A | 10/1998 | Chaco et al. |
| 5,590,179 A | 12/1996 | Shincovich et al. | 5,825,772 A | 10/1998 | Dobbins et al. |
| 5,592,491 A | 1/1997 | Dinkins | 5,826,195 A | 10/1998 | Westerlage et al. |
| 5,594,431 A | 1/1997 | Sheppard et al. | 5,828,044 A | 10/1998 | Jun et al. |
| 5,596,719 A | 1/1997 | Ramakrishnan et al. | 5,832,057 A | 11/1998 | Furman |
| 5,602,843 A | 2/1997 | Gray | 5,838,223 A | 11/1998 | Gallant et al. |
| 5,604,414 A | 2/1997 | Milligan et al. | 5,838,237 A | 11/1998 | Revell et al. |
| 5,604,869 A | 2/1997 | Mincher et al. | 5,838,812 A | 11/1998 | Pare, Jr. et al. |
| 5,606,361 A | 2/1997 | Davidsohn et al. | 5,841,118 A | 11/1998 | East et al. |
| 5,608,786 A | 3/1997 | Gordon | 5,841,764 A | 11/1998 | Roderique et al. |
| 5,613,620 A | 3/1997 | Center et al. | 5,842,976 A | 12/1998 | Williamson |
| 5,615,277 A | 3/1997 | Hoffman | 5,844,808 A | 12/1998 | Konsmo et al. |
| 5,619,192 A | 4/1997 | Ayala | 5,845,230 A | 12/1998 | Lamberson |
| 5,625,410 A | 4/1997 | Washino et al. | 5,852,658 A | 12/1998 | Knight et al. |
| 5,628,050 A | 5/1997 | McGraw et al. | 5,854,994 A | 12/1998 | Canada et al. |
| 5,629,687 A | 5/1997 | Sutton et al. | 5,862,201 A | 1/1999 | Sands |
| 5,629,875 A | 5/1997 | Adair, Jr. | 5,864,772 A | 1/1999 | Alvarado et al. |
| 5,630,209 A | 5/1997 | Wizgall et al. | 5,873,043 A | 2/1999 | Comer |
| 5,631,554 A | 5/1997 | Briese et al. | 5,874,903 A | 2/1999 | Shuey et al. |

| Patent | Date | Name |
|---|---|---|
| 5,880,677 A | 3/1999 | Lestician |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyroudis |
| 5,892,924 A | 4/1999 | Lyon et al. |
| 5,896,097 A | 4/1999 | Cardozo |
| 5,897,607 A | 4/1999 | Jenney et al. |
| 5,898,369 A | 4/1999 | Godwin |
| 5,905,438 A | 5/1999 | Weiss et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,941,363 A | 8/1999 | Partyka et al. |
| 5,941,955 A | 8/1999 | Wilby et al. |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Dutta et al. |
| 5,953,371 A | 9/1999 | Roswell et al. |
| 5,955,718 A | 9/1999 | Levasseur et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,986,574 A | 11/1999 | Colton |
| 5,987,421 A | 11/1999 | Chuang |
| 5,991,625 A | 11/1999 | Vanderpool |
| 5,991,639 A | 11/1999 | Rautiola et al. |
| 5,994,892 A | 11/1999 | Turino et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,054,920 A | 4/2000 | Smith et al. |
| 6,060,994 A | 5/2000 | Chen |
| 6,061,604 A | 5/2000 | Russ et al. |
| 6,064,318 A | 5/2000 | Kirchner, III et al. |
| 6,067,017 A | 5/2000 | Stewart et al. |
| 6,067,030 A | 5/2000 | Burnett et al. |
| 6,069,886 A * | 5/2000 | Ayerst et al. ............... 370/336 |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,087,957 A | 7/2000 | Gray |
| 6,088,659 A | 7/2000 | Kelley et al. |
| 6,094,622 A | 7/2000 | Hubbard et al. |
| 6,100,817 A | 8/2000 | Mason, Jr. et al. |
| 6,101,427 A | 8/2000 | Yang |
| 6,101,445 A | 8/2000 | Alvarado et al. |
| 6,112,983 A | 9/2000 | D'Anniballe et al. |
| 6,115,580 A * | 9/2000 | Chuprun et al. ............... 455/1 |
| 6,119,076 A | 9/2000 | Williams et al. |
| 6,121,593 A | 9/2000 | Mansbery et al. |
| 6,121,885 A | 9/2000 | Masone et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,172,616 B1 | 1/2001 | Johnson et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,188,354 B1 | 2/2001 | Soliman et al. |
| 6,192,390 B1 | 2/2001 | Berger et al. |
| 6,198,390 B1 | 3/2001 | Schlager et al. |
| 6,199,068 B1 | 3/2001 | Carpenter |
| 6,208,266 B1 | 3/2001 | Lyons et al. |
| 6,215,404 B1 | 4/2001 | Morales |
| 6,218,953 B1 | 4/2001 | Petite |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite ............... 379/155 |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,286,756 B1 | 9/2001 | Stinson et al. |
| 6,288,634 B1 | 9/2001 | Weiss et al. |
| 6,288,641 B1 | 9/2001 | Carsais |
| 6,295,291 B1 | 9/2001 | Larkins |
| 6,301,514 B1 | 10/2001 | Canada et al. |
| 6,304,556 B1 | 10/2001 | Haas |
| 6,305,205 B1 * | 10/2001 | Derks et al. ............... 72/225 |
| 6,305,602 B1 | 10/2001 | Grabowski et al. |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,334,117 B1 | 12/2001 | Covert et al. |
| 6,351,223 B1 | 2/2002 | DeWeerd et al. |
| 6,356,205 B1 * | 3/2002 | Salvo et al. ............... 340/853.3 |
| 6,357,034 B1 | 3/2002 | Muller et al. |
| 6,362,745 B1 | 3/2002 | Davis |
| 6,363,057 B1 | 3/2002 | Ardalan et al. |
| 6,366,217 B1 | 4/2002 | Cunningham et al. |
| 6,369,769 B1 | 4/2002 | Nap et al. |
| 6,370,489 B1 | 4/2002 | Williams et al. |

| | | |
|---|---|---|
| 6,373,399 B1 | 4/2002 | Johnson et al. |
| 6,380,851 B1 | 4/2002 | Gilbert et al. |
| 6,384,722 B1 | 5/2002 | Williams |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,411,889 B1 | 6/2002 | Mizunuma et al. |
| 6,415,245 B2 | 7/2002 | Williams et al. |
| 6,421,354 B1 * | 7/2002 | Godlewski ................. 370/466 |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 * | 12/2002 | Sivavec et al. .............. 210/739 |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B2 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,671,586 B2 * | 12/2003 | Davis et al. ................ 700/295 |
| 6,674,403 B2 | 1/2004 | Gray et al. |
| 6,678,255 B1 | 1/2004 | Kuriyan |
| 6,678,285 B1 | 1/2004 | Garg |
| 6,731,201 B1 * | 5/2004 | Bailey et al. ........... 340/310.01 |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,804,532 B1 | 10/2004 | Moon et al. |
| 6,891,838 B1 | 5/2005 | Petite |
| 6,914,533 B2 | 7/2005 | Petite |
| 6,914,893 B2 | 7/2005 | Petite |
| 6,959,550 B2 | 11/2005 | Freeman et al. |
| 7,054,271 B2 | 5/2006 | Brownrigg et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite |
| 2002/0013679 A1 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 * | 2/2003 | Davis ........................ 709/224 |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 * | 3/2003 | Daum et al. ................. 709/223 |
| 2003/0058818 A1 | 3/2003 | Wilkes et al. |
| 2003/0069002 A1 | 4/2003 | Hunter et al. |
| 2003/0078029 A1 | 4/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo |
| 2004/0047324 A1 | 3/2004 | Diener |
| 2004/0053639 A1 | 3/2004 | Petite |
| 2004/0131125 A1 | 7/2004 | Sanderford, Jr. et al. |
| 2004/0183687 A1 | 9/2004 | Petite |
| 2004/0228330 A1 | 11/2004 | Kubler et al. |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |
| 2006/0095876 A1 | 5/2006 | Brownrigg et al. |

FOREIGN PATENT DOCUMENTS

| | | |
|---|---|---|
| EP | 07144 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| WO | WO 90/13197 | 11/1990 |
| WO | 9524177 | 9/1995 |
| WO | WO 98/00056 | 1/1998 |
| WO | WO 98/37528 | 8/1998 |
| WO | WO 99/13426 | 3/1999 |

| | | |
|---|---|---|
| WO | WO03/007264 | 1/2000 |
| WO | 0023956 | 4/2000 |
| WO | 200023956 A1 | 4/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO02/052521 | 7/2002 |
| WO | WO 03/007264 | 1/2003 |
| WO | WO 03/021877 | 3/2003 |
| WO | 0402014 | 12/2003 |

OTHER PUBLICATIONS

U.S. Utility Patent Application entitled "System and Method for Controlling Power Demand Over an Integrated Wireless Network," U.S. Appl. No. 09/929,926, filed Aug. 15, 2001, consisting of 96 pages, 11 pages of drawings, inventors: James Davis and Thomas D. Petite.

Westcott, Jil et al., "A Distributed Routing Design For A Broadcoast Environment", IEEE 1982, pp. 10.4.0-10.4.5.

Khan, Robert E. et al., "Advances in Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233-238.

Lynch, Clifford A. et al., Packet Radio Networks, Architectures, Protocols, Technologies and Applications.

Brownrigg, Edwin, "User Provided Access to the Internet,", Open Access Solutions, http://web.simmons.edu/chen/nit/NIT'92/033-bro.htm, Jun. 8-9, 2005.

Khan, Robert E., "The Organization of Computer Resources into a Packet Radio Network," IEEE, Jan. 1977, vol. Com-25 No. 1, pp. 169-178.

Westcott, Jill A., "Issues in Distributed Routing for Mobile Packet Radio Network," IEEE 1982, pp. 233-238.

Brownrigg, E.B. et al.; A Packet Radio Network for Library Automation; IEEE (1987); pp. 456-462.

Brownrigg, E.B. et al.; A Packet Radio Networks; Architectures, Protocols, Technologies and Applications (1987), (introduction pp. ix-xviii); pp. 3-274.

Brownrigg, E.B. et al.; Distributions, Networks, and Networking: Options for Dissemination; Workshop on Electronic Texts Session III (http://palimpsest.standford.edu/byorg/lc/etextw/sess3.html 1992): pp. 1-10.

Brownrigg, E.B. et al.; User Provided Access to the Internet; (http://web.simmons.edu/~chen/nit/NIT'92/033-bro.htm 2005) pp. 1-6.

Wey, Jyhi-Kong et al.; Clone Terminator: An Authentication Service for Advanced Mobile Phone System; IEEE (1995); pp. 175-179.

Davis, A.B. et al.; Knowledge-Based Management of Cellular Clone Fraud; IEEE (1992); pp. 230-234.

Johnson, David B.; Routing in Ad Hoc Networks of Mobile Hosts; IEEE (1995); pp. 158-163.

Jubin, John and Tornow, Janet D., "The Darpa Packet Radio Network Protocols,"Proceedings of the IEEE, vol. 75, No. 1, Jan. 1987, pp. 21-32.

Kleinrock, Leonard and Kamoun, Farouk, "Hierarchical Routing for Large Networks," North-Holland Publishing Company, Computer Networks 1, 1997, pp. 155-174.

Perkins, C.E. et al.; Highly Dynamic Destination-Sequenced Distance-Vector Routing (DSDV) for Mobile Computers; SIGCOMM 94-9/94 London England UK (1994); pp. 234-244.

Wu, J.; Distributed System Design; CRC Press (1999); pp. 177-180 and 204.

Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-1469.

* cited by examiner

SYSTEM AND METHOD FOR TRANSMITTING POLLUTION INFORMATION OVER AN INTEGRATED WIRELESS NETWORK

BACKGROUND OF THE INVENTION

1. Field of the Invention

The present invention generally relates to communicating pollution information and, in particular, to a system and method for generating and transmitting pollution information through an integrated wireless communication network.

2. Related Art

Regulation of allowable pollution discharges into the environment from pollution sources are governed by federal, state and/or local laws. Generally, the least strict pollution criteria are defined by federal law. Federal agencies typically enforce various federal pollution laws by requiring timely reporting of pollution discharges and violations of criteria, by requiring clean-up of the pollution discharges, and by requiring termination of the discharges from the pollution sources. Furthermore, state laws, local laws and/or company policies may set stricter criteria at specific locations. Such pollution criteria define limits of pollution sources that may, or are, polluting air, water and/or soil. Pollution discharges can include materials, chemicals, or even noise.

Detectors are used to detect the presence of pollution. Such detectors, placed in suitable locations, provide information that may be used to detect a violation of an applicable pollution criteria and provide data to ascertain the extent of the discharge. Or, detectors may be used to demonstrate compliance with applicable pollution criteria (in that failure to detect pollution discharges implies that the pollution source is operating in compliance with applicable pollution discharge regulations).

A threshold is defined in a pollution detector such that when pollution is detected at a level at least equal to the threshold, the pollution detector generates a signal and/or data indicating that pollution levels are exceeding the threshold. Data may include, but is not limited to, the level of pollution, times of detection and/or type of pollution detected.

However, such pollution detectors are often monitored on a periodic basis. Thus, data provided by such pollution detectors would indicate a pollution discharge after the initial discharge event. If the discharge is ongoing, serious pollution criteria violations may occur. If the discharge is ongoing and not reported in a timely manner, even from a low rate discharge that would not otherwise cause a criteria violation had the discharge been detected and remedied in a timely manner, very serious pollution violations may result. Regulatory agencies may impose expensive fines, require expensive clean-up measures, may require monitoring and/or may shut down the polluting facility.

Pollution detectors may be located in difficult to access locations. For example, pollution detectors configured to monitor water conditions may be submerged. Or, pollution detectors configured to monitor ground water conditions may be located deep inside a well. Or, pollution detectors configured to monitor air pollution may be located on high structures or seasonally inaccessible locations such as mountain tops. Or, pollution detectors configured to monitor air pollution may be placed on mobile equipment such as large earth movers at an ore mine. Such difficult to access pollution detectors may result in the untimely reporting of discharges and/or may result in increased monitoring expenses.

Also, if the data from the pollution detectors are manually collected, the data collection process may be labor intensive and expensive. Furthermore, data entry may also be time consuming and expensive. Accordingly, many hours of data collection and entry time may be required for even a relatively simple pollution detection system.

Thus, a heretofore unaddressed need exists in the industry for providing a pollution information communication system that more timely indicates the nature, location and/or other pertinent information associated with a pollution discharge. Also, there is a heretofore unaddressed need to provide a less expensive to monitor and a more conveniently accessed pollution information communication system.

SUMMARY OF THE INVENTION

The present invention overcomes the inadequacies and deficiencies of the prior art as discussed hereinabove. One embodiment of the present invention, a pollution message communication system, provides a system and method for communicating pollution information messages corresponding to detected pollution discharges and/or the presence of pollution by pollution detectors. The pollution message communication system employs a transceiver network with a plurality transceivers residing in a network. A plurality of transceivers are coupled to one of a plurality of pollution detectors each located at one of a plurality of locations. The transceivers each have unique identification codes. In one embodiment, transceivers broadcast and receive radio frequency (RF) signals. A site controller provides communications between the plurality of transceiver units and a pollution monitoring management controller residing in a pollution message system control center.

One embodiment of the present invention can also be viewed as providing a method for communicating pollution information messages. In this regard, the method can be broadly summarized by the following steps. Generating a pollution information message with a transceiver having at least an identification code uniquely assigned to the transceiver, and communicating the pollution information message from the transceiver to a network transceiver such that the pollution information message is communicated over an intermediate communication system to a pollution monitoring management controller.

Another embodiment of the present invention can be broadly summarized by the following steps. Receiving a pollution information message broadcasted from a transceiver having at least an identification code uniquely assigned to the transceiver, determining information relevant to the received pollution information message by associating the information with the identification code of the transceiver, and communicating the pollution information message and the relevant information, such as to a person.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION a. Overview of the Pollution Information Message System

In general, the present invention relates to a system and method for communicating pollution information messages that are transmitted from a transceiver, through a transceiver network, to a pollution monitoring management controller so that a discharge of pollution and/or the presence of pollution is detected and reported in a timely manner, as described in greater detail below. The pollution information message, in one embodiment, is generated in response to a detector that detects the presence of pollution.

Figure 1:
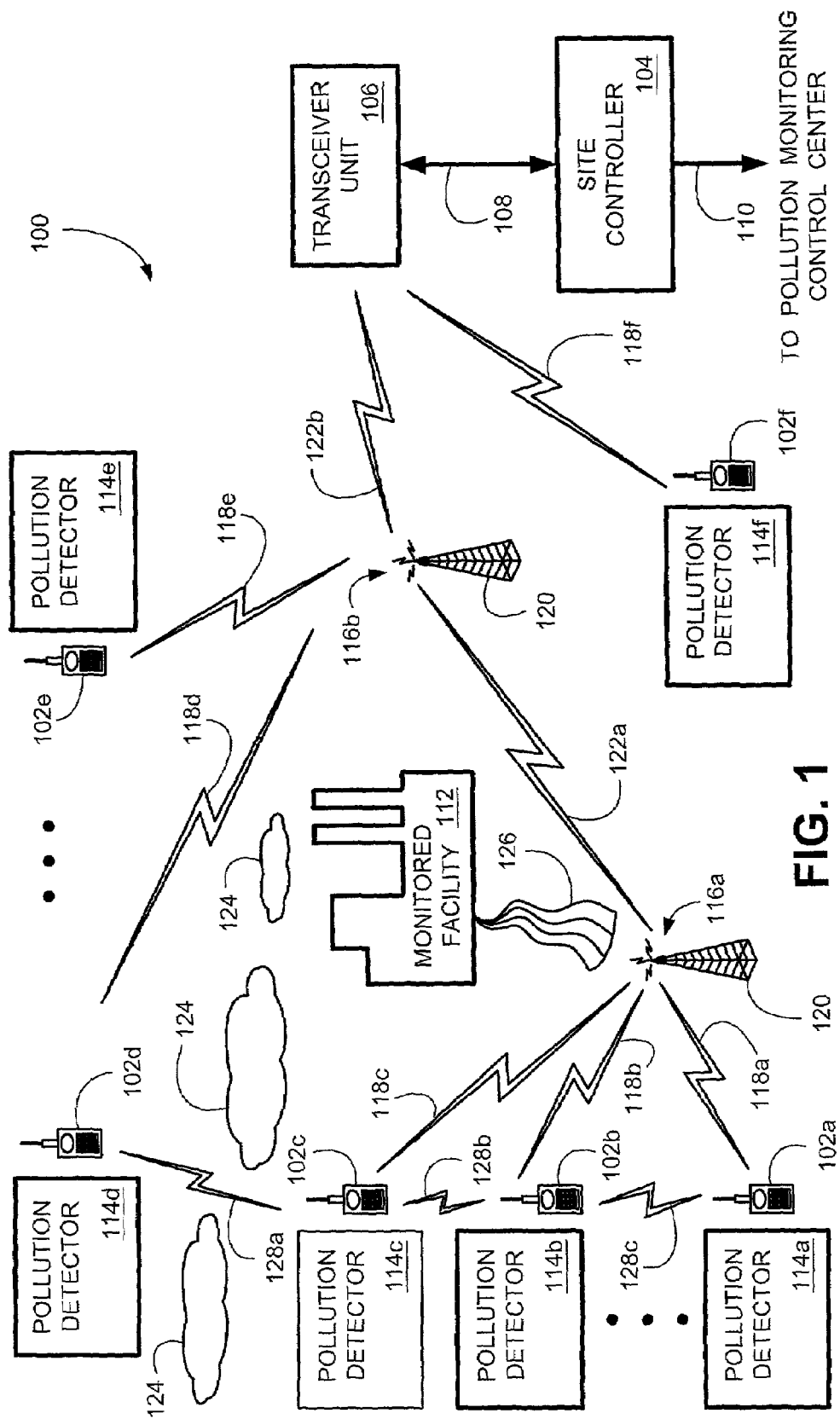
FIG. 1 is a block diagram illustrating a portion of a plurality of transceivers residing in a transceiver network configured to communicate pollution information.

FIG. 1 is a block diagram illustrating a portion of a transceiver network 100 having a plurality transceivers 102a-102f. Preferably, in one embodiment, transceivers 102a-102f are configured to selectively broadcast and/or receive pollution information messages using radio frequency (RF) signals. A site controller 104 provides communications between a transceiver unit 106, via connection 108, and a pollution monitoring management controller 302 residing in a pollution monitoring control center 300 (FIG. 3), via connection 110.

Figure 2:
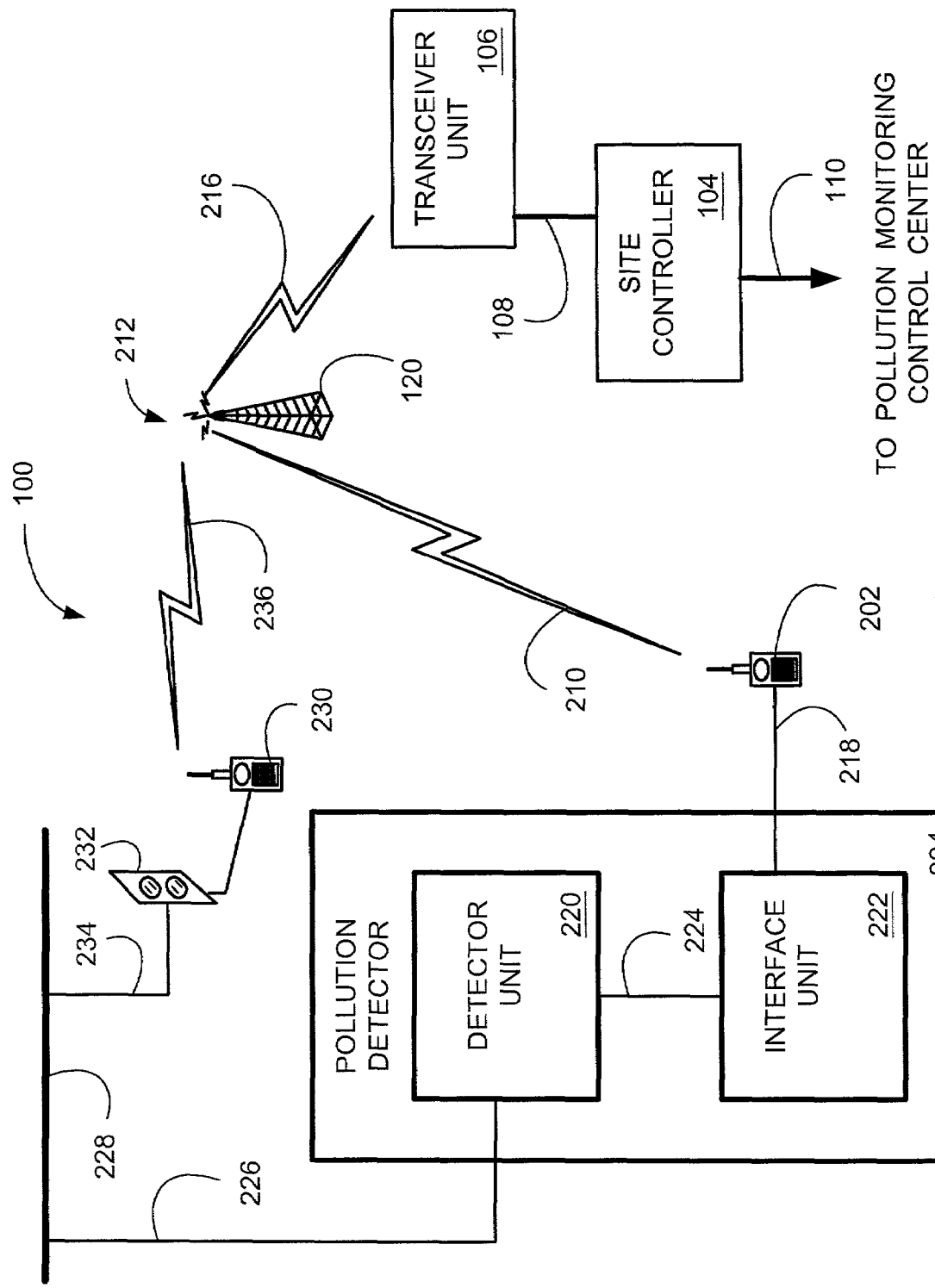
FIG. 2 is a block diagram illustrating an embodiment of a transceiver of FIG. 1 coupled to a pollution detection device.

FIG. 2 is a block diagram illustrating one embodiment of a pollution information communication system with a transceiver 202 coupled to a pollution detector 204. In one embodiment, if a pollution level exceeding a predefined threshold is detected, the pollution detector 204 generates a signal having pollution information, described in greater detail below, that is communicated to the transceiver 202. That is, when the presence of pollution is detected, thereby indicating a pollution discharge, the pollution detector begins communication with the transceiver 202.

In another embodiment, the pollution detector 204 is in continues communication with the transceiver 202 so that pollution information is provided on a real-time basis. Here, if no pollution is detected, or pollution levels are detected below a threshold, the information may demonstrate compliance with applicable pollution discharge regulations.

In one embodiment, in response to receiving a signal and/or data from the pollution detector 204, the transceiver 202 transmits a pollution information message via an RF signal 210 that is detected by transmitter station 212. Transmitter station 212, located on a suitable high point, such as a tower 120 (see also FIG. 1) or the like, transmits an RF signal 216 to the transceiver unit 106. The transceiver unit 106 communicates the pollution information message to the site controller 104. Eventually, the pollution information message is received by the pollution monitoring control center 300 (FIG. 3), in a manner described in greater detail below.

Figure 3:
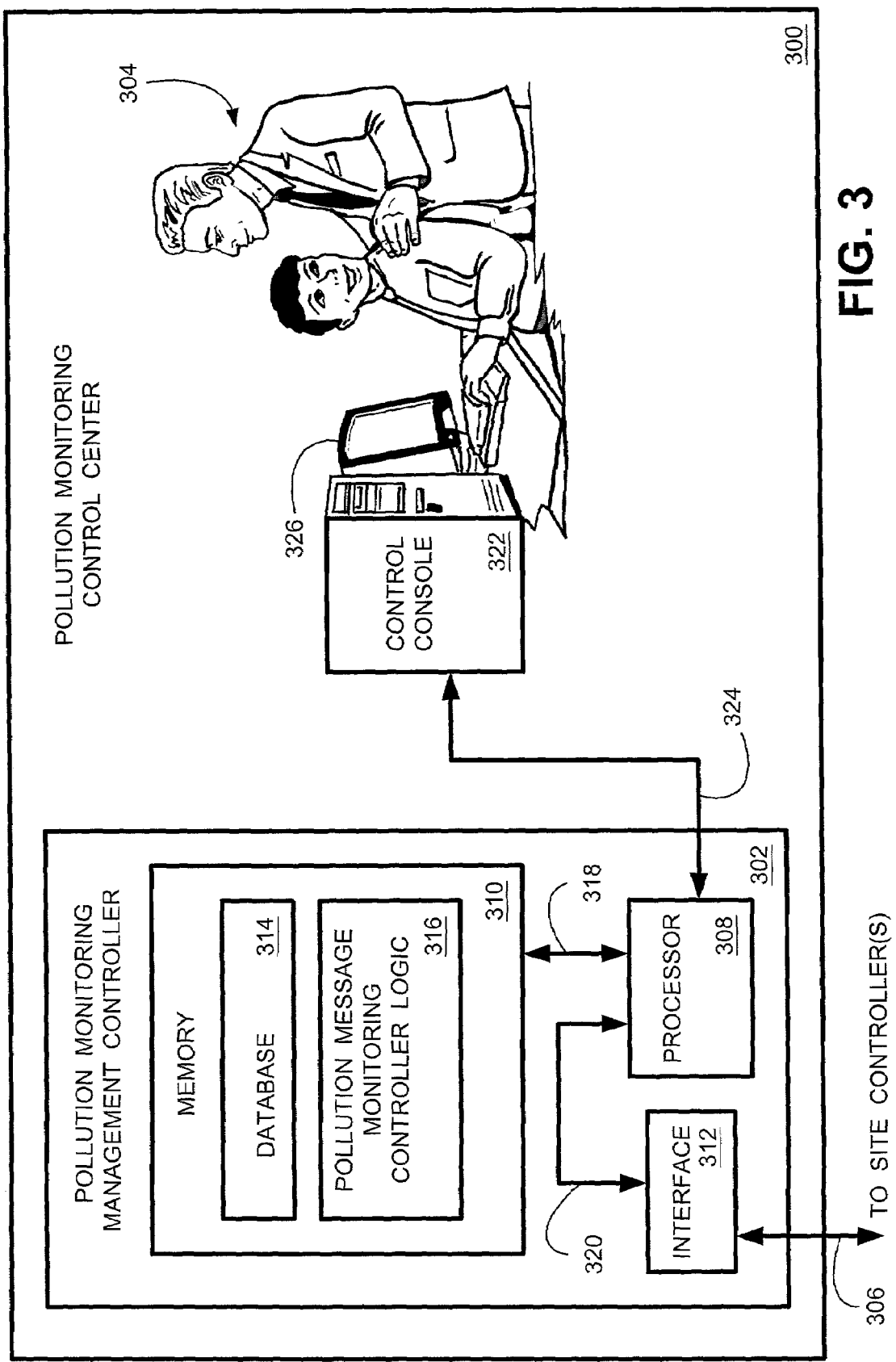
FIG. 3 is a block diagram illustrating selected components of an embodiment of a pollution monitoring control center in communication with the transceiver network of FIG. 1.

FIG. 3 is a block diagram illustrating selected components of a pollution monitoring control center 300 in communication with the transceiver network 100 (FIG. 1). The received pollution information messages are received by a pollution monitoring management controller 302, described in greater detail below. In one embodiment, the control room operators 304 receive a processed pollution information message from the pollution monitoring management controller 302 and initiate appropriate actions in response to the received pollution information message. In another embodiment, the pollution information is communicated to an automatic system.

b. Pollution Information Message Transceiver System Environment

FIG. 1 is a block diagram illustrating a portion of a transceiver network 100 in communication with a plurality of transceivers 102a-102f residing in proximity to a monitored facility 112. At least one transceiver is coupled to each one of the pollution detectors 114a-114f, as will be described in greater detail below.

For convenience of illustration, and for convenience of explaining the operation and functionality of the pollution information message system, only a single monitored facility 112 is illustrated on FIG. 1. A monitored facility 112 may be a factory, a business or other location where a plurality of pollution detectors 114a-114f are located. Furthermore, the term "monitored facility" as used herein may also be any location where pollution detectors are located to detect the presence of pollution. For example, but not limited to, the pollution detectors may be located in proximity to a lake, reservoir, mountain, canyon or other location of interest.

A pollution information message system is configured to receive pollution information messages, in a manner described below, from hundreds, even thousands, of transceivers, depending upon the particular architecture in which the pollution information message system is implemented. Therefore, the explanation of the operation and functionality of the pollution information message system described below is limited to a small segment of the transceiver network 100 for convenience.

A pollution information message transmitted from any one of the transceivers 102a-102f is relayed to the pollution monitoring management controller 302 (FIG. 3) via one or more of the transceiver stations 116a and 116b. Preferably, in one embodiment, the transceivers broadcast the pollution information message using a suitable radio frequency (RF) signal. The pollution information message includes at least the identification code of the transceiver generating the pollution information message.

For example, transceivers 102a, 102b and 102c are illustrated as transmitting pollution information messages to transceiver station 116a via RF signals 118a, 118b and 118c, respectively. Similarly, transceivers 102d and 102e broadcast pollution information messages to transceiver station 116b via RF signals 118d and 118e, respectively. Thus, pollution detectors 114c and/or 114d may detect a presence of air pollution emissions 124 from the monitored facility 112. Accordingly, transceivers 102c and 102d, respectively, would then communicate pollution information messages to their respective receiving transceiver stations 116a and 116b.

A transceiver (not shown) in transceiver station 116a is illustrated as communicating a pollution information message to transceiver station 116b via signal 122a. The transceivers 102a-102e, and/or transceivers residing in the transceiver stations, may be identical to each other or may be configured to have different characteristics, such as different bandwidths, frequencies and/or signal broadcast strengths.

Each of the transceiver stations 116a and 116b detect broadcasted pollution information messages from a broadcasting transceiver 102a-102e, depending upon the strength of the broadcasted pollution information message and the distance of the transceiver stations 116a and 116b from the broadcasting transceiver. That is, a transceiver stations 116a and 116b detect broadcasted pollution information messages from any transceivers and/or any transceiver stations in its reception range. Preferably, transceiver stations 116a and 116b reside at a suitably elevated location, such as on a tower 120, high building, mountain top or the like to facilitate reception and transmission of pollution information messages. Pollution information messages from the transceivers 102a-102e are relayed by the transceiver stations 116a and 116b to the transceiver unit 106 via RF signals 122a-122b. Each transceiver station has a transceiver (network transceiver) configured to communicate pollution information messages with the transceivers 102a-102e, transceiver stations, and/or at least one transceiver unit 106.

In one embodiment, transceivers are configured to communicate directly with transceiver unit 106, assuming the broadcasting transceivers are within broadcasting range of the transceiver unit 106. For example, pollution detector 114f may detect a fluid discharge 126 from the monitored facility 122. Accordingly, transceiver 102f would broadcast a pollution information message, via signal 118f, directly to the transceiver unit 106.

The transceivers residing in the transceiver station may be the same as one of the transceivers 102a-102f, or be configured to have different characteristics such as different bandwidths, frequencies and/or signal broadcast strengths. In some applications, a unique identification code associated with the broadcasting transceiver station is added to the pollution information message.

For example, a pollution information message detected by the transceiver station 116a is relayed to the transceiver station 116b via RF signal 122a. The pollution information message is then relayed by the transceiver station 116b to the transceiver unit 106 via RF signal 122b. Similarly, a pollution information message detected by the transceiver station 116b is relayed to the transceiver unit 106 via RF signal 122b.

One embodiment of the pollution information message system employs transceivers that use standardized digital communication formats such that the information is communicated as packetized units of digital data. Other embodiments employ other suitable communication formats. Other suitable communication formats may be either digital or analog signals.

The transceiver unit 106 converts received pollution information messages into a suitable communication signal formatted for communication over a hardwire connection 108. In one embodiment, the transceiver unit 106 formats the received broadcasted RF pollution information messages into a standardized RS 232 signal. Another embodiment converts the received pollution information messages into a standardized RS 485 signal. The transceiver unit 106 may be configured to convert the received pollution information messages from the transceivers 102a-102f and/or transceiver stations 116a and 116b of the transceiver network 100 into any suitable signal for transmission over a hardwire interconnection, such as, but not limited to, a metallic conductor, a coaxial cable, an optical fiber cable or the like. In some applications, a unique identification code associated with the transceiver unit 106 is added to the pollution information message.

When transceivers (not shown) at other monitored facilities (not shown) are integrated into the transceiver network 100, a large network of transceivers will be able to communicate pollution information messages to the pollution monitoring management controller 302. For convenience of illustration, only one monitored facility 112 is illustrated in FIG. 1. Many other monitored facilities and/or locations may be incorporated into the transceiver network 100 such that all of the transceivers are communicating to the pollution monitoring management controller 302 via the transceiver network 100.

A portion of the transceiver network 100 illustrated in FIG. 1 is configured according to the strength of the broadcasted RF signals 118a-118f from the plurality of transceivers 102a-102f, and the strength of the broadcasted signals 122a and 122b from the plurality of transceiver stations 116a and 116b. Thus, many more transceiver units coupled to pollution monitors may be located out in a monitored area. Additional transceiver stations are deployed as necessary.

Site controller 104 is configured to communicate with any desired number of transceiver units. Furthermore, a plurality of site controllers can be deployed within a monitored area, thereby increasing the area of coverage of the transceiver network 100. There are no known limitations that would limit the number of transceivers in communication with the pollution monitoring control center 300 (FIG. 3) when a suitable number of transceiver units and site controllers are implemented with a plurality of transceivers to form a transceiver network 100.

Site controller 104, in another embodiment, is configured to include other functionalities. Such functionalities may be implemented in a site controller without departing substantially from the operation and functionality of the invention. For example, a site controller 104 may be configured to transmit acknowledgment signals back to the transceiver initiating the pollution information message or another designated transceiver. Such an embodiment is particularly advantageous in indicating that a pollution information message has been received from a location of interest. In some applications, a unique identification code associated with the site controller 104 is added to the pollution information message.

Furthermore, for convenience of illustration, the site controller 104 and the transceiver unit 106 are illustrated as separate components coupled together via connection 108. In another embodiment, the transceiver unit 106 and the site controller 104 are incorporated into a single unit that performs substantially the same functionality of the transceiver unit 106 and the site controller 104. Alternatively, the transceiver unit 106 and site controller 104 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102b may have the unique identification code "102b". When a pollution information message is relayed by the transceiver 102b to the pollution monitoring management controller 302 (FIG. 3), the pollution information message is tagged or otherwise identified with the unique identity code "102b". Thus, the pollution monitoring management controller 302 knows where the transceiver 102b is located since location information for the transceiver 102b is retained in a database 314 (FIG. 3), described in greater detail below. To determine the location of the transceiver generating a pollution information message, the pollution monitoring management controller 302 need only associate the location information in the database 314 with the unique identification code of the transceiver since the pollution information message contains the identification code of the transceiver. Also, in one embodiment, the nature of the pollution information can be determined if the type of pollution monitor coupled to the transceiver 102b is described in the database 314.

Furthermore, the pollution monitoring management controller 302 may specifically poll the transceiver 102b to provide information by broadcasting a signal, using the unique identification code "102b", such that the transceiver 102b recognizes that it is instructed to broadcast the status information back to the pollution monitoring management controller 302. The pollution information message management controller 302, via site controller 104, instructs transceiver 106 to broadcast an information request signal to the transceiver 102b. Thus, transceiver unit 106 broadcasts an information request signal to transceiver station 116b. Transceiver station 116b broadcasts the information request signal to transceiver station 116a, which then broadcasts the information request signal to the transceiver 102b. Status information may include information of interest such as, but not limited to, the operational condition of the transceiver, the pollution detector, and/or their components. Furthermore, status information may include information regarding pollution detected by the pollution detector, such as but not limited to, current levels of detected pollution, type of detected pollution, nature of the detected pollution or other measured pollution related parameters. Such an embodiment is particularly advantageous in providing pollution information at desired intervals to, for example, but not limited to, form databases to perform scientific studies and/or to demonstrate compliance with relevant pollution regulations.

Similarly, the pollution monitoring management controller 302 is in communication with all of the individual transceivers of FIG. 1 such that a pollution information message is associated with specific transceivers. Furthermore, the pollution monitoring management controller 302 may request information from any desired transceiver integrated into the transceiver network 100.

For convenience of illustration, and for convenience of describing the operation and functionality of transceiver 202, the transceiver 202 is illustrated as coupled to a simplified pollution detector 204, via connection 218. Pollution detector 204 includes at least a detector unit 220 and interface unit 222. Detector unit 220 is configured to detect the presence of pollution. Such a detector unit 220, in one embodiment, is configured to detect particular types of pollution and/or to detect the level, quantity, magnitude or the like of the pollution.

For example, such a pollution detector unit 220 may be configured to detect nitrogen oxide (NOX) pollution in the air from a nearby power plant. Another embodiment of the detector unit 220 is configured to generate signals indicating detection of the specified pollutants when the level of the pollutant exceeds a predefined threshold. Other known pollution detectors known in the art of detecting pollution may be similarly coupled to a transceiver for integration into a pollution information message system. Detailed operations of these pollution detectors, and the associated components residing in the pollution detectors, are not described in detail herein other than to the extent necessary to understand the operation and functioning of these detectors when employed as part of a pollution information message system. Accordingly, any such pollution detector, when integrated into a pollution information message system, is intended to be disclosed herein and to be protected by the accompanying claims.

Pollution detector 204 includes an interface unit 222 coupled to the detector unit 220, via connection 224, and coupled to transceiver 202, via connection 218. Interface unit 222 receives pollution information from the detector unit 220 and processes the received information into a signal suitable for the transceiver 202. Thus, the detector unit 220 detects the presence of pollutants and the interface unit 222 configures the information from the detector unit 220 into a signal suitable for the transceiver 202. Then, the pollution information message is generated and transmitted by the transceiver 202. The interface unit 222 may be implemented using any suitable known interface device configured to receive information from a pollution detector and configured to generate a signal suitable for a transceiver employed in a pollution information message system. Other embodiments of the interface unit 222 may be specially fabricated and specially designed interface units manufactured specifically for integration into a pollution information message system. Detailed operation of the interface unit 222, and the associated components residing in the interface unit 222, is not described in detail herein other than to the extent necessary to understand the operation and functioning of the interface unit 222 and its components when employed as part of a pollution information message system. Accordingly, any such interface unit 222 is intended to be disclosed herein and to be protected by the accompanying claims.

c. Integrating the Pollution Information Message Transceiver System into a Pollution Information Message System Control Center FIG. 3 is a block diagram illustrating selected components of one embodiment of a pollution monitoring control center 300 in communication with the transceiver network 100. Included as an integral component of the pollution information message system is the pollution monitoring management controller 302. The pollution monitoring management controller 302 is coupled to at least one of the previously described site controllers 104 via connection 306. Connection 306 is coupled to connection 110 (FIGS. 1 and 2) through an intermediary communication system, described in greater detail below.

The pollution monitoring management controller 302 includes at least a processor 308, a memory 310 and an interface 312. Memory 310 includes at least a database 314 and the pollution message monitoring controller logic 316. Processor 308 is coupled to the memory 310 via connection 318 and is coupled to the interface 312 via connection 320.

When one of the plurality of transceivers residing in the transceiver network 100 transmits a pollution information message, the pollution monitoring management controller 302 receives the pollution information message and stores the received pollution information message into database 314 or in another suitable location in a memory. Processor 308 executes the pollution message monitoring controller logic 316 to appropriately store the received pollution information message into the database 314 or in another suitable location in a memory. In one embodiment, database 314 employs a look-up table.

The database 314 includes information of interest such as, but not limited to, the identification code of each the transceivers, the location of the transceiver, and the nature of the pollution information message. The nature of the pollution information message in some applications is determined by the type of pollution detection to which the transceiver is coupled to. For example, if the transceiver is coupled to a pollution detector configured to detect chemical "abc," the database 314 would include information indicating that a pollution detector is coupled to the transceiver such that a pollution information message received from that transceiver would indicate the possible presence of a chemical "abc" detected by the pollution detector.

Other information of interest may also be included in the database 314. For example, but not limited to, information identifying the specific customer, customer's address and/or attributes of the customer's facility may be included within database 314. Also, individuals that should be contacted when a pollution information message is received may also be included in the database 314. The nature of the pollution detector that is monitored by the transceiver may also be included within the database 314. Such information pertaining to the nature of the detector includes, but is not limited to, make, model, manufacturer, manufacture date and/or components. Accordingly, any type of information of interest may be included within the database 314. Furthermore, information regarding attributes of the transceivers, the transceiver stations, the transceiver units and the site controllers, such as, but not limited to, make, model, manufacturer, manufacture date, components, identification codes and/or locations, may be included in database 314.

The pollution monitoring management controller 302 is illustrated as being coupled to the control console 322, via connection 324. Typically, the control room operators 304 interface with the various components residing in the pollution monitoring control center 300 via one or more control consoles 322. Information is displayed on a suitable interface device, such as a display screen 326. Thus, a control room operator 304, after determining a valid pollution information message is received, may take appropriate actions.

Figure 4:
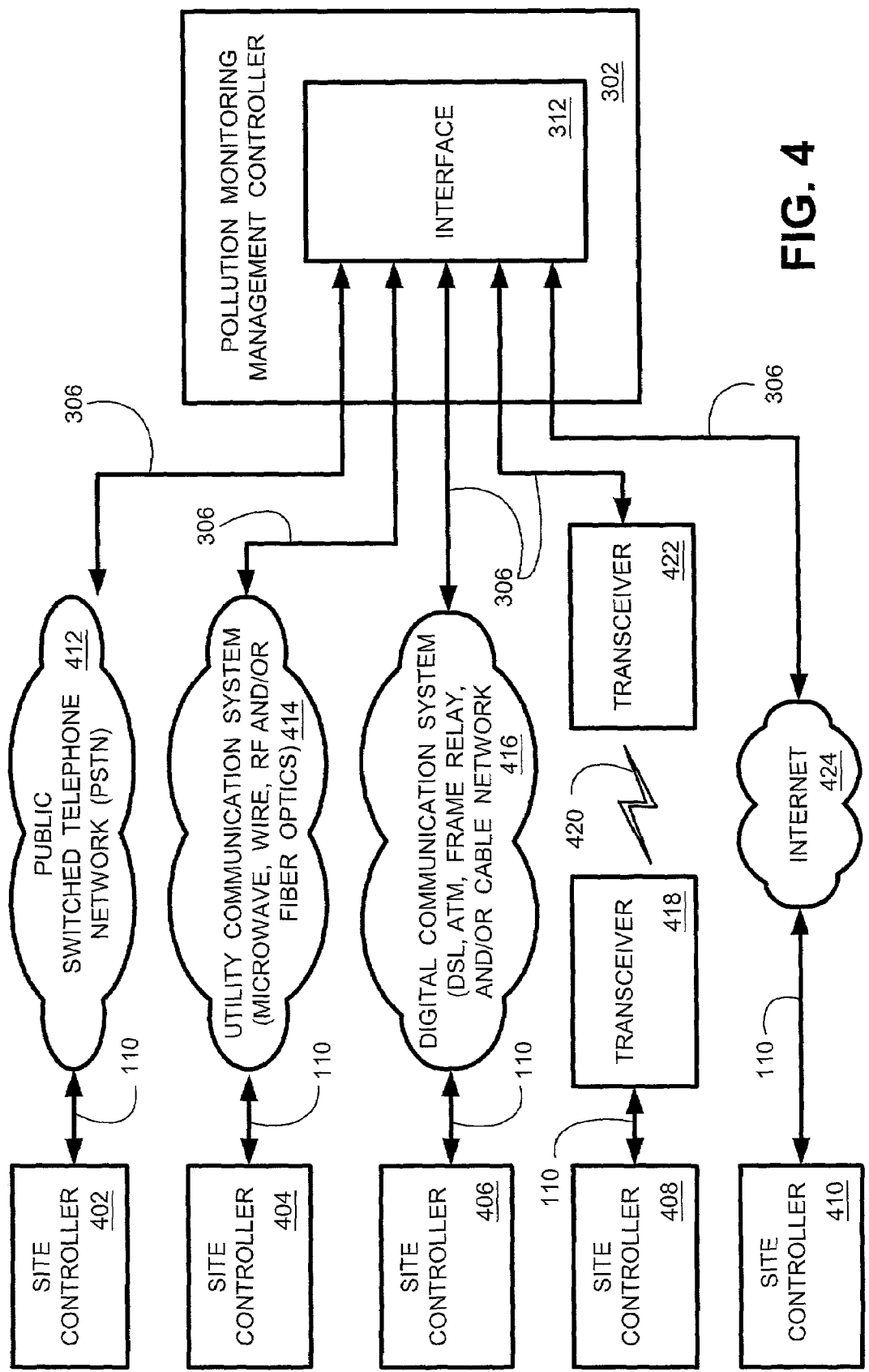
FIG. 4 is a block diagram illustrating alternative intermediate communication systems employed by the pollution information communication system of FIGS. 1-3.

In another embodiment, the pollution monitoring management controller 302 is coupled to an automatic system, such as but not limited to, a system control and data acquisition (SCADA) system. Such an embodiment is advantageous in automatically monitoring and controlling a facility. For example, but not limited to, pollution may be monitored such that a value or gate in a piping system is operated upon detection of pollution.

d. Communication Between Site Controllers and the Pollution Monitoring Management Controller As described above with reference to FIGS. 1-3, a site controller 104 (FIGS. 1 and 2) is in communication with the interface 312 residing in the pollution monitoring management controller 302 (FIGS. 3 and 4). FIG. 4 is a block diagram illustrating alternative intermediate communication systems employed by the pollution information message system. Five exemplary site controllers 402, 404, 406, 408 and 410 are illustrated as being coupled to the interface 312 residing in the pollution monitoring management controller 302, via five communication systems. These exemplary intermediate communication systems are intended to illustrate some, but not all, of the possible communication systems through which the connections 110 (FIGS. 1-2) and 306 (FIG. 3) may coupled to such that the pollution information message system enables communication between the site controllers and the pollution monitoring management controller 302.

Site controller 402 is communicating to interface 312 via a public switched telephone network (PSTN) 412, via connections 110 and 306. Thus, site controller 402 is configured to provide a suitable signal having pollution information that is provided to the PSTN 412. PSTN 412 receives the suitably configured pollution information from the site controller 402 and relays the information to the interface 312. Interface 312 converts the received pollution information from the PSTN 412 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the PSTN 412. The suitably formatted acknowledgment signal is then communicated through the PSTN 412 and is transmitted to the site controller 402 via connections 306 and 110. The site controller 402 then converts the received acknowledgment signal from the PSTN 412 into a suitably formatted signal for transmission out to the selected transceiver(s) as described above.

The components (not shown) residing in the interface 312 and the site controller 402 that are configured to transmit, receive and convert signals from the PSTN 412 are known in the art and, therefore, are not described in detail herein other than to the extent necessary to understand the operation and functioning of these components when employed as part of the interface 312 and the site controller 402. Such known components are too numerous to describe in detail herein, and that any configuration of such known components having the above-described functionality may be implemented in the interface 312 and the site controller 402 without departing substantially from the pollution information message system. Any such implementation of components configured to receive and convert communication signals from PSTN 412 are intended to be within the scope of this disclosure and to be protected by the accompanying claims.

Site controller 404 is communicating to interface 312 via a legacy utility communication system 414, via connections 110 and 306. Thus, site controller 404 is configured to provide a suitable signal having pollution information that is provided to the legacy utility communication system 414. The legacy utility communication system 414 is a known communication system employed by the electric utility or other responsible organization for the monitoring and/or control of an electric energy distribution system or transmission system.

The legacy utility communication system 414 is an integrated network of communication technologies that may include, but is not limited to, microwave communication systems, wire based communication systems, RF communications or fiber optics networks. Furthermore, these various communication systems are integrated into a composite communication system. Thus site controller 404 is configured to interface at convenient location on the legacy utility communication system 414 such that the site controller 404 provides the appropriately formatted information to the legacy utility communication system.

For example, site controller 404 may integrate into an existing fiber optics portion of the legacy utility communication system 414. In one embodiment, site controller 404 is configured to interface with a suitably configured fiber optics connector to provide interconnectivity directly to the fiber optics networks, or alternatively, is configured to communicate with various communication components that are associated with the communication of optical signals over the fiber optics network. Another embodiment of site controller 404 is configured to communicate with the microwave portions, the wire portions, or the RF portions of the legacy utility communication system 414.

The legacy utility communication system 414 receives the suitably configured pollution information from the site controller 410 and relays the information to the interface 312. Interface 312 converts the received pollution information from the legacy utility communication system 414 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the legacy utility communication system 414. The suitably formatted acknowledgment signal is then communicated through the legacy utility communication system 414 and is transmitted to the site controller 404, via connections 306 and 110. The site controller 404 then converts the received acknowledgment signal from the legacy utility communication system 414 into a suitably formatted signal for transmission out to the selected transceiver(s) as described above.

The components (not shown) residing in the interface 312 and the site controller 404 that are configured to transmit, receive and convert signals from the legacy utility communication system 414 are known in the art and, therefore, are not described in detail herein other than to the extent necessary to understand the operation and functioning of these components when employed as part of the interface 312 and the site controller 404. Such known components are too numerous to describe in detail herein and that any configuration of such known components having the above-described functionality may be implemented in the interface 312 and the site controller 404 without departing substantially from the pollution information message system. Any such implementation of the components configured to receive and convert communication signals from the legacy utility communication system 414 are intended to be within the scope of this disclosure and to be protected by the accompanying claims.

Site controller 406 is communicating to interface 312 via a digital communication system 416, via connections 110 and 306. Thus, site controller 406 is configured to provide a suitable signal having pollution information that is provided to the digital communication system 416. The digital communication system 416 is a based communication system configured to communication information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 416 receives the suitably configured pollution information from the site controller 406 and relays the information to the interface 312. Interface 312 converts the received pollution information from the digital communication system 416 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the digital communication system 416. The suitably formatted acknowledgment signal is then communicated through the digital communication system 416 and is transmitted to the site controller 406, via connections 306 and 110. The site controller 406 then converts the received acknowledgment signal from the digital communication system 416 into a suitably formatted signal for transmission out to the selected transceiver(s) as described above.

The components (not shown) residing in the interface 312 and site controller 406 that are configured to received and convert signals from the digital communication system 416 are known in the art and, therefore, are not described in detail herein other than to the extent necessary to understand the operation and functioning of these components when employed as part of the interface 312 and the site controller 406. Such well known components are too numerous to describe in detail herein, and that any configuration of such known components having the above-described functionality may be implemented in the interface 312 and the site controller 406 without departing substantially from the pollution information message system. Any such implementation of the components configured to receive and convert communication signals from the digital communication system are intended to be within the scope of this disclosure and to be protected by the accompanying claims.

Site controller 408 is communicating to interface 312 via a radio frequency (RF) communication system having at least a first transceiver 418 configured to broadcast RF signals 420 to transceiver 422. An alternative embodiment employs other mediums of broadcast signals, such as, but not limited to, microwave. Thus, site controller 408 is configured to provide a suitable signal having pollution information that is provided to the transceiver 418. The transceiver 418 receives the suitably configured pollution information from the site controller 408 and relays the information to transceiver 422. The transceiver 422 relays the information to the interface 312. Interface 312 converts the received pollution information from the transceiver 422 and reformats the pollution information into a suitable communication signal that is provided to processor 308 (FIG. 3) such that the pollution information is stored in the data base 314 in a manner described above.

In one embodiment, when the pollution monitoring management controller 302 issues an acknowledgment signal, the interface 312 converts the acknowledgment signal into a suitable signal formatted for communication between transceivers 422 and 418. The suitably formatted acknowledgment signal is then communicated through the transceivers 422 and 418 and is transmitted to the site controller 408 via connections 306 and 110. The site controller 408 then converts the received acknowledgment signal from the transceivers 422 and 418 into a suitably formatted signal for transmission out to the selected transceiver(s) as described above.

The components (not shown) residing in the interface 312 and the site controller 408 that are configured to transmit, receive and convert signals from the transceivers 418 and 422 are known in the art and, therefore, are not described in detail herein other than to the extent necessary to understand the operation and functioning of these components when employed as part of the interface 312 and the site controller 408. Such known components are too numerous to describe in detail herein, and that any configuration of such known components having the above-described functionality may be implemented in the interface 312 and the site controller 408 without departing substantially from the pollution information message system. Any such implementation of the components configured to receive and convert communication signals from the transceivers 418 and 422 are intended to be within the scope of this disclosure and to be protected by the accompanying claims.

Site controller 410 is communicating to interface 312 via an Internet system 424, via connections 110 and 306. Thus, site controller 410 is configured to provide a suitable signal having pollution information that is provided to the Internet system 424. Internet system 424 receives the suitably configured pollution information from the site controller 410 and relays the information to the interface 312. Interface 312 converts the received pollution information from the Internet system 424 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the Internet system 424. The suitably formatted acknowledgment signal is then communicated through the Internet system 424 and is transmitted to the site controller 410 via connections 306 and 110. The site controller 410 then converts the received acknowledgment signal from the Internet system 424 into a suitably formatted signal for transmission out to the selected transceiver(s) as described above.

The components (not shown) residing in the interface 312 and the site controller 410 that are configured to transmit, receive and convert signals from the Internet system 424 are known in the art and, therefore, are not described in detail herein other than to the extent necessary to understand the operation and functioning of those components when employed as part of the interface 312 and the site controller 410. Such well known components are too numerous to describe in detail herein, and that any configuration of such known components having the above-described functionality may be implemented in the interface 312 and the site controller 410 without departing substantially from the pollution information message system. Any such implementation of components configured to receive and convert communication signals from the Internet system 424 are intended to be within the scope of this disclosure and to be protected by the accompanying claims.

Other embodiments of the site controllers and the interface 312 are configured to communicate with other communication networks or combination networks having a plurality of segments employing different communication technologies on each segment. For example, a site controller and a interface could be configured to communicate over satellite based communication systems. Another example includes a combination system that employs the PSTN 408 and the Internet system 412. Such a combination system would include an interface device to interface the PSTN 408 with the Internet system 412. There are no intended limitations with respect to the interfacing communication technology through which a site controller and an interface 312 (FIG. 3) communicate. Any such implementation of a site controller and an interface 312 configured to communicate through another communication technology in accordance with the operation and functionality of the pollution information message system described herein is intended to be within the scope of this disclosure and to be protected by the accompanying claims.

One embodiment of the site controller and/or interface 312 employs a plurality of standardized components, and is configured to receive an interface card. The interface card is configured to provide connectivity to the communication system that is used by the pollution information message system to communicate over. Such an embodiment is particularly suited to implementing a mass produced pollution information message system.

e. Operation of the Pollution Monitoring Management Controller

Figure 5:
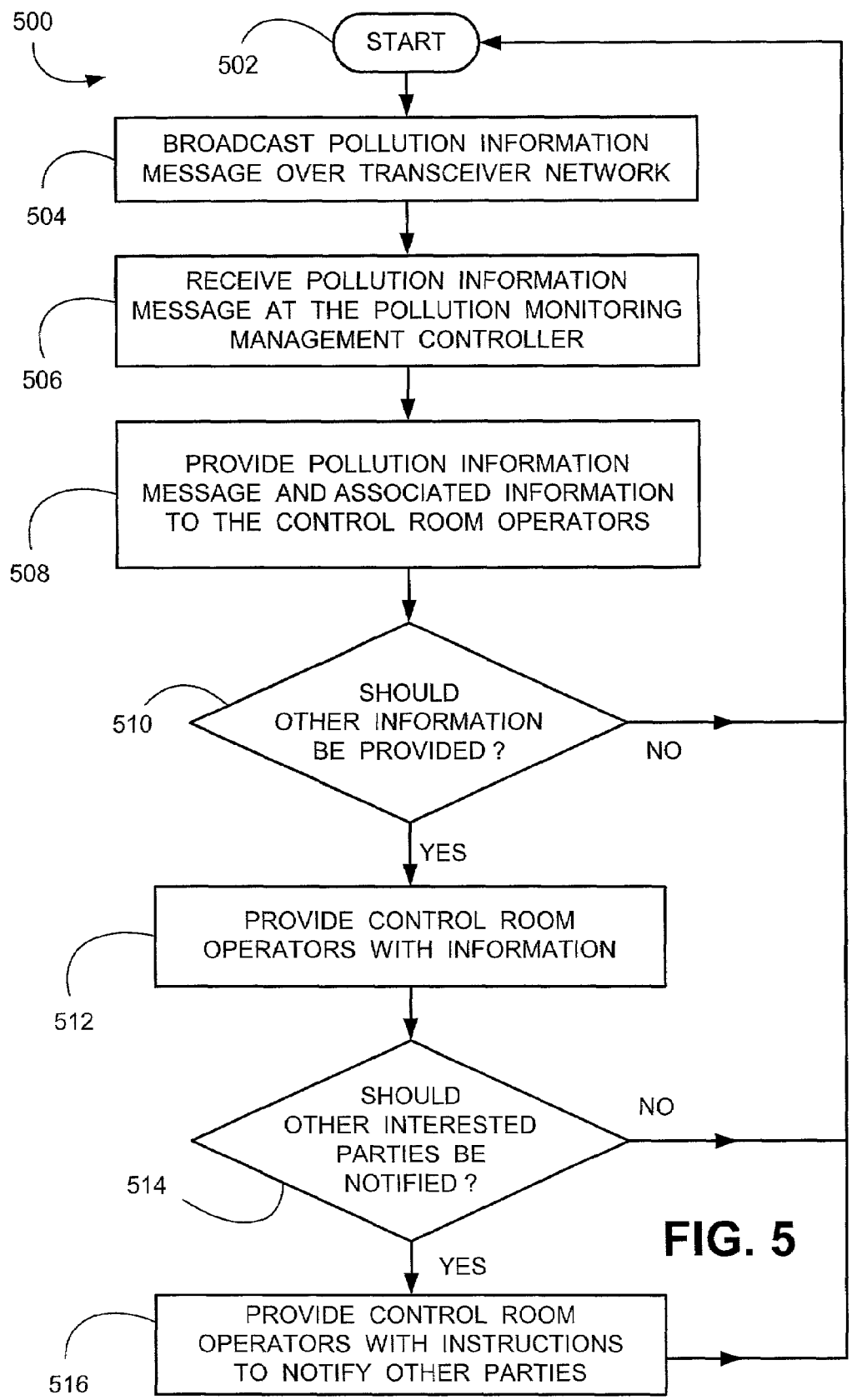
FIG. 5 is a flow chart illustrating a process for communicating a pollution information message generated by one of the transceivers of FIGS. 1-2.

FIG. 5 is a flow chart 500 illustrating a process for communicating a pollution information message generated by one of the transceivers of FIGS. 1-2. The flow chart 500 shows the architecture, functionality, and operation of a possible implementation of the software associated with the pollution message monitoring controller logic 316 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 5, or may include additional functions, without departing significantly from the functionality of the process of the pollution monitoring management controller. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

When the pollution message monitoring controller logic 316 is implemented as software and stored in memory 310 (FIG. 3), the pollution message monitoring controller logic 316 can be stored on any computer readable medium for use by or in connection with any computer and/or processor related system or method. In the context of this document, a memory 310 is a computer readable medium that is an electronic, magnetic, optical, or other another physical device or means that contains or stores a computer and/or processor program. The pollution message monitoring controller logic 316 can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with the pollution message monitoring controller logic 316. In the context of this specification, a "computer readable medium" can be any means that can store, communicate, propagate, or transport the program associated with the pollution message monitoring controller logic 316 for use by or in connection with the instruction execution system, apparatus, and/or device. The computer readable medium can be, for example, but not limited to, an electronic, magnetic, optical, electro-magnetic, infrared, or semiconductor system, apparatus, device, or propagation medium. More specific examples (a nonexhaustive list) of the computer readable medium would include the following: an electrical connection having one or more wires, computer readable storage medium, such as a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the pollution message monitoring controller logic 316 is printed, as the program can be electronically captured, via for instance optical scanning of the paper or other medium, then compiled, interpreted or otherwise processed in a suitable manner if necessary, and then stored in memory 310 or in another suitable memory.

The process starts at block 502 when the presence of pollution is detected by a pollution detector, as described above. At block 504, a transceiver is actuated in response to receiving a signal from the pollution detector such that a pollution information message is broadcasted over the transceiver network 100 (FIG. 1). At block 506, the pollution information message is received at the pollution monitoring management controller 302 (FIG. 3) in a manner described above. At block 508, the pollution monitoring management controller 302 executes the pollution message monitoring controller logic 316. Accordingly, in one embodiment, a suitably formatted pollution information message is provided to the control room operators 304 (FIG. 3).

At block 510, a determination is made whether or not other information should be provided. If no other information is provided at block 510 (the NO condition), the process returns to block 502. If other information should be provided to the control room operators 304 (the YES condition), the other information is provided to the control room operators 304 at block 512. As described above, such information may include, but is not limited to, the identification code of each the transceivers, the location of the transceiver, and the nature of the detected pollution.

At block 514, a determination is made whether or not other interested parties should be notified. If no other interested parties are to be notified at block 510 (the NO condition), the process returns to block 502. If other information should be provided to the control room operators 304 (the YES condition), the other information is provided to the control room operators 304 at block 516. For example, the pollution message monitoring controller logic 316 may determine that a company representative associated with a monitored facility, government regulatory authorities, or other individual(s) identified in the database 314 should be notified of the received >pollution information message. The process then returns to block 502 to await the next pollution event.

f. Transceiver Maintenance Feature

One embodiment described above employs transceivers configured to transmit pollution information messages back to the pollution monitoring management controller 302 (FIG. 3). Each transceiver includes its unique identification code as part of the broadcasted pollution information message. Location information for each transceiver, identified in database 314 (FIG. 3), is determined by associating the identification code in the received pollution information message with the corresponding location information (identified by the corresponding identification code). Transceivers transmitting information back to the pollution monitoring management controller 302, in one embodiment, are configured to include logic that indicates the operational status of the pollution detecting device and/or its associated components back to the pollution monitoring management controller 302. The pollution message monitoring controller logic 316 (FIG. 3) includes a transceiver maintenance function that evaluates received status and information from the signals transmitted by the transceivers such that the operational integrity of the pollution detector is accessed. That is, if a component in the pollution detector fails, the status information indicates failure of that component. The pollution message monitoring controller logic 316 provides the appropriate indication to the control room operators 304 such that maintenance personnel are dispatched out to the pollution detecting device and/or the transceiver to effect a repair of the nonfunctioning or improperly functioning component.

One embodiment employing the above-described maintenance feature employs transceivers configured to periodically transmit status information to the pollution monitoring management controller 302 at predefined time intervals. Another embodiment employs transceivers configured to respond to a status information request generated by the pollution monitoring management controller 302. Here, logic residing in the pollution message monitoring controller logic 316 would perform a maintenance function wherein pre-selected transceivers are requested to provide status information. Another embodiment employs transceivers configured to generate periodic status reports to the pollution monitoring management controller 302 and are configured to respond to requests for status information from the pollution monitoring management controller 302. In yet another embodiment, all three types of the above-described transceivers are employed to communicate status information to the pollution monitoring management controller 302.

When a transceiver component that broadcast the status information fails, such as, but not limited to, the transceiver itself, the failure is detected by a loss of signal. Thus, in an embodiment employing a transceiver that is to provide an acknowledgment signal, or provide a status signal in response to a status information request, or is to provide periodic status information reports, the failure of the transceiver to respond or provide information at scheduled times and/or in response to a status inquiry, indicates a component failure.

Summarizing, the above-described embodiment includes a maintenance functionality such that the operational status of the transceivers residing in the transceiver network 100 (FIG. 1) and/or pollution detectors are monitored to ensure continuous operational functionality. Other components of the above-described communication network, such as the detectors and/or their components, may be also monitored. Thus, a detected failure in a transceiver, transceiver component, detector and/or a detector component may be quickly detected such that maintenance personnel are dispatched to repair the failed transceiver, detector or components. This embodiment is particularly advantageous in providing a pollution information message system having a high degree of operational reliability and integrity.

g. Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both the capability to receive broadcasted signals and to broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

In one embodiment, the communication path that a transceiver employs for broadcasting signals is predefined. For example, transceiver 102a in FIG. 1 was described above as transmitting pollution information messages to transceiver unit 106 over the path defined by signals 118a, 122a and 122b. That is, when the transceiver unit 106 receives a pollution information message from transceiver 102a, transceiver stations 116a and 116b are configured to relay the signal to the transceiver unit 106. Here, if another transceiver station (not shown) detects the pollution information message from transceiver 102a, that transceiver station simply ignores the detected pollution information message and does not relay the pollution information message.

In one embodiment, transmission paths for all transceivers are predetermined by the pollution monitoring management controller 302 (FIG. 3). Path information is broadcasted out to all components of the transceiver network 100, transceiver stations, transceiver units and site controllers. This information is stored in a memory residing in or coupled to each of the components of the transceiver network 100, transceiver stations, transceiver units and site controllers. Each component then configures itself to react only to those signals for which it is part of the predefined path. Thus, when the transceiver unit 102b detects a pollution information message from transceiver 102a, transceiver units 102b recognizes that it is not part of the path to transceiver 102a, and simply takes no action.

In one embodiment, the communication paths are defined by using the identification codes associated with each transceiver, and identification codes assigned to the transceiver stations, transceiver units and site controllers. For example, if site controller 104 is defined by the identification code "104", transceiver unit 106 is defined by the identification code "106", transceiver station 116b is defined by the identification code "116b", transceiver station 116a is defined by the identification code "116a", and transceiver 102a is defined by the identification code "102a", the path between the site controller 104 and transceiver 102a is simply defined by a code such as 104.106.116b.116a.102a (where each number corresponds to the component identification code). Other suitable codes are easily defined.

Such a system is described in detail in the commonly assigned patent entitled "MULTI-FUNCTION GENERAL PURPOSE TRANSCEIVER," filed Mar. 18, 1999, and accorded U.S. Pat. No. 6,233,327B1, issued on May 15, 2001 and incorporated herein by reference in its entirety.

In one embodiment of the pollution information message system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the pollution monitoring management controller 302 (FIG. 3) redefines communication paths for affected transceivers, and transmits the redefined paths out to the transceivers, transceiver stations, transceiver units and site controllers such that the paths are redefined. For example, transceiver station 116a (FIG. 1) may fail. Thus, transceivers 102a, 102b and 102c (FIG. 1) will not be in communication with the pollution monitoring management controller 302 (FIG. 3). The communication path for transceiver 102c would then be redefined such that transceiver 102c is communicating with transceiver 102d (assuming that transceiver 102d is sufficiently close to transceiver 102c to detect signals broadcasted from transceiver 102c). Thus, transceiver 102c would be in communication with the transceiver unit 106 (FIG. 1) through a newly defined path indicated by the signals 128a, 118d and 122b (FIG. 1). Here, transceiver 102d is operating as both a transceiver (when communicating information from the pollution detector 114d) and a network transceiver (when communicating information from other transceivers).

Similarly, the communication path for transceiver 102b would then be redefined such that transceiver 102b is communicating with transceiver 102c (assuming that transceiver 102c is sufficiently close to transceiver 102b to detect signals broadcasted from transceiver 102b). Thus, transceiver 102b would be in communication with the transceiver unit 106 through a newly defined path indicated by the signals 128b, 128a, 1118d and 122b (FIG. 1). Here, transceivers 102c and 102d are operating as both a transceiver (when communicating information from the pollution detectors 114c and 114d, respectively) and a network transceiver (when communicating information from other transceivers).

Similarly, the communication path for transceiver 102a would then be redefined such that transceiver 102a is communicating with transceiver 102b (assuming that transceiver 102b is sufficiently close to transceiver 102a to detect signals broadcasted from transceiver 102a). Thus, transceiver 102a would be in communication with the transceiver unit 106 through a newly defined path indicated by the signals 128c, 128b, 128a, 118d and 122b (FIG. 1). Here, transceivers 102b, 102c and 102d are operating as both a transceiver (when communicating information from the pollution detectors 114b, 114c and 114d, respectively) and a network transceiver (when communicating information from other transceivers).

One skilled in the art will appreciate that the possible communication paths in a transceiver network 100 are nearly limitless, and that such communication paths are easily redefined by the pollution monitoring management controller 302. The above described examples are intended to illustrate some of the alternative redefined communication paths to explain the operation and functionality of the maintenance feature of one embodiment of the pollution information message system.

h. Alternative Embodiments of the Pollution Information Message System

For convenience of describing the operation and functionality of the pollution monitoring management controller 302 (FIG. 3), an integral part of the pollution information message system, the pollution monitoring management controller 302 was illustrated as a stand-alone unit. The pollution monitoring management controller 302, in an alternative embodiment, is implemented as an integral component of another system, such as, but not limited to, a facility monitoring system, without departing substantially from the operation and functionality of the pollution information message system.

Furthermore, the components illustrated as residing in the pollution monitoring management controller 302 may reside in alternative convenient locations outside of the pollution monitoring management controller 302 without adversely affecting the operation and functionality of the pollution information message system. Such components may even be integrated with other existing components residing in the pollution monitoring control center, thereby minimizing the cost of implementing a pollution information message system.

For example, the database 314 residing in the memory 310 (FIG. 3) may be implemented in a memory unit residing in an alternative location, such as the control console 322. Thus, information provided used the pollution information message system could simply be transferred to a database residing in the alternative location.

Similarly, the pollution message monitoring controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intra-network interface or the like that performs the functionality of receiving information through a communication network from the site controller 104 (FIGS. 1 and 2).

For convenience of describing the operation and functionality of the pollution monitoring management controller 302

(FIG. 3), the pollution monitoring management controller 302 is illustrated as a stand-alone unit residing within the pollution monitoring control center 300. Another embodiment of the pollution monitoring management controller resides in an alternative convenient location outside of the pollution monitoring control center 300. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example the pollution monitoring management controller 302 could be in communication with the pollution information message system over any one of the communication systems described above and illustrated in FIG. 4. Such a configuration is easily implemented using appropriate interface components. Such interface components residing in a pollution monitoring management controller that are configured to transmit, receive and convert signals are known in the art and, therefore, are not described in detail herein other than to the extent necessary to understand the operation and functioning of these components when employed as part of the pollution information message system that is remote from the pollution monitoring control center 300. One skilled in the art will realize that such known components are too numerous to describe in detail herein, and that any configuration of such known components having the above-described functionality may be implemented without departing substantially from the pollution information message system.

One embodiment of the pollution information message system is configured to couple a plurality of transceivers to a plurality of mobile air pollution detectors. A detector is used to monitor each one of a fleet of vehicles such that total pollution of the entire fleet is monitored or pollution from an individual unit of the fleet is monitored. Another embodiment is configured to monitor individual vehicles and/or various components of the vehicle to detect pollution. Such an embodiment is desirable in applications where, for example, but not limited to, exhaust emission and fluid leakages are monitored on the vehicle.

Another embodiment employs a power line carrier (PLC) signal to communicate signals from pollution detectors such that a receiving transceiver generates a pollution information message. For example, but not limited to, detector unit 220 (FIG. 2), in one embodiment, is supplied power via wire 226 which is coupled to the electric distribution network 228. Rather than being coupled to the transceiver 202, the detector unit 220 is configured to generate a suitable PLC signal and to communicate pollution information to the transceiver 230 using PLC signals.

Transceiver 230 is coupled to the electric distribution network 228 at a suitable location. For convenience of illustration, transceiver 230 is illustrated as being coupled to an electrical outlet 232. Electrical outlet 232 is coupled to the electric distribution network 228 via wire 234. One embodiment employs a standard outlet spade-type connector (not shown) to couple the transceiver 230 to the electrical outlet 232. Another embodiment of the transceiver 230 is coupled to the outlet 232 with wire connections coupled at suitable connection points. Another embodiment of the transceiver 230 is coupled to another suitable location on the electric distribution network 234 such that the transceiver 230 is able to reliably receive signals from the detector unit 220.

Thus, when the detector unit 220 detects pollution, a PLC signal is communicated from the detector unit 220 to the transceiver 230 over the electric distribution network 228. Upon receiving a PLC signal having pollution information, the transceiver 226 generates and communicates a pollution information signal 236 in any one of the previously described manners. The communication of PLC signals, and the equipment that generates PLC signals, is known in the art, and is therefore not described in further detail other than to the extent necessary to understand the communication of PLC signals to a transceiver employed as part of a pollution monitoring management system.

Other detectors coupled to the electric distribution network may also be configured to generate PLC signals that are communicated to transceiver 226. Such an embodiment of pollution detection system employing detector units communicating to transceiver 230 with PLC signals is particularly advantageous when it is desirable to employ a pollution detection system within a facility having a distribution network 228 that can be conveniently accessed.

The embodiment of the pollution information message system was described herein to include a plurality of transceiver units configured to communicate based upon a predefined communication path specified by the pollution monitoring management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. Another system for controlling electricity demand in a defined territory is disclosed in the co-pending commonly assigned non-provisional application entitled "SYSTEM AND METHOD FOR CONTROLLING POWER DEMAND OVER AN INTEGRATED WIRELESS NETWORK," filed Aug. 15, 2001, and accorded Ser. No. 09/929,926, incorporated herein by reference in its entirety. The above applications describe a computerized system for monitoring power and/or other conditions in a defined territory using a network of transceivers communicating back to a remote facility via a plurality of repeaters and a central system (such as a site controller). The plurality of transceivers configured for monitoring power and/or other conditions in a defined territory are integrated with a plurality of transceivers for controlling customer premises appliances, thereby reducing overall facility, maintenance and installation costs by employing common units. For example, a transceiver controlling an air conditioning unit or a transceiver monitoring pollution (in accordance with the application Ser. No. 09/929, 926) may be integrated to communicate through same transceiver stations, transceiver units and/or site controllers communication pollution information messages. The integrated system would simply recognize the transceiver communicating a pollution information message and appropriately route communications to and/or from that transceiver to the appropriate remote facility. One skilled in the art will appreciate that a pollution information message system described herein is interpretable into any other special purpose system or a multipurpose system based upon a network of similarly configured transceivers that communicate through common components.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system which communicates pollution information messages, comprising:
a first transceiver having a first identification code and coupled to a detector configured to detect pollution, the first transceiver in communication with a transceiver network, the first transceiver configured to generate a pollution information message and transmit the pollution information message to the transceiver network,
the transceiver network further comprising:
a plurality of network transceivers, each network transceiver having a unique identification code and configured to communicate the pollution information message with other network transceivers;
at least one transceiver unit configured to communicate the pollution information message with at least one of the network transceivers, the pollution information message comprising information including pollution detector type, detected pollution levels, and pollution detector operational status;
at least one site controller coupled to the transceiver unit, the site controller configured to communicate the pollution information message between the transceiver unit and an intermediary communication system wherein the pollution information message is communicated to a pollution monitoring management controller coupled to the intermediary communication system; and
the pollution monitoring management controller comprising logic to redefine a communication path from the first transceiver to the pollution monitoring management controller if the pollution monitoring management controller does not receive a pollution information message from the first transceiver at a scheduled time or in response to a status inquiry.

2. The system of claim 1, wherein the intermediary communication system further comprises a portion of an Internet.

3. The system of claim 1, wherein the intermediary communication system further comprises a portion of a digital communication system.

4. The system of claim 1, wherein the intermediary communication system further comprises a portion of a public switched telephone network.

5. The system of claim 1, wherein the intermediary communication system further comprises a combination of portions of at least an Internet, a digital communication system and a public switched telephone network.

6. The system of claim 1, wherein the intermediary communication system further comprises a combination of portions of at least an Internet and a public switched telephone network.

7. The system of claim 1, wherein the intermediary communication system further comprises a combination of portions of at least an Internet and a digital communication system.

8. The system of claim 1, wherein the intermediary communication system further comprises a combination of portions of at least a digital communication system and a public switched telephone network.

9. The system of claim 1, wherein the first transceiver is coupled to a pollution detecting device and is configured to generate the pollution information message in response to a signal received from the pollution detecting device.

10. The system of claim 1, further comprising a memory residing in each one of the network transceivers and the first transceiver such that a communication transmission path is defined by at least one of the unique identification codes of the network transceivers and the first identification code of the first transceiver, the communication transmission path being used to identify a location of the first transceiver.

11. The system of claim 1, further comprising a memory residing in the first transceiver such that the first identification code resides in the memory and such that the first identification code is included as a portion of the pollution information message, whereby the first identification code is used to identify the nature of the pollution.

12. The system of claim 1, further comprising a second transceiver having a second identification code and coupled to an electric distribution system, the second transceiver configured to communicate pollution information with the detector using a power line carrier (PLC) signal communicated over the electric distribution system, and further configured to communicate the pollution information message with at least one of the network transceivers.

13. A computer readable storage medium storing a program for communicating pollution information messages, the program comprising logic configured to perform the steps of:
analyzing a pollution information message broadcasted from a series of transceivers, the pollution information message having an identification code uniquely assigned to the transceiver, pollution detector type, detected pollution levels, and pollution detector operational status;
determining information relevant to the received pollution information message by associating the information with the identification code of the transceiver;
generating a second pollution information message having the pollution information message and the relevant information such that a person is made aware of the received pollution information message;
determining a communication path to transmit the pollution information message within the series of transceivers; and
redefining the communication path if the pollution information message from the first transceiver is not received at a scheduled time or in response to a status inquiry.

14. A method for communicating pollution information messages, the method comprising:
generating a pollution information message with a transceiver, the pollution information message having an identification code uniquely assigned to the transceiver, pollution detector type, detected pollution levels, and pollution detector operational status;
communicating the pollution information message from the transceiver to a second transceiver coupled to a pollution detector;
communicating the pollution information from the second transceiver to the network transceiver such that the pollution information message is communicated over an intermediary communication system to a pollution monitoring management controller;
defining a communication path to transmit the pollution information message from the transceiver to the second transceiver; and
redefining the communication path if the pollution information message from the first transceiver is not received at a scheduled time or in response to a status inquiry.

15. The method of claim 14, further comprising communicating the pollution information message onto the intermediary communication system.

16. The method of claim 15, wherein communicating the pollution information message onto the intermediary communication system further comprises converting the pollution information message into a suitable Internet signal, and wherein the intermediary communication system is a portion of an Internet.

17. The method of claim 15, wherein communicating the pollution information message onto the intermediary communication system further comprises converting the pollution information message into a suitable digital signal, and wherein the intermediary communication system is a portion of a digital communication system.

18. The method of claim 15, wherein communicating the pollution information message onto the intermediary communication system further comprises converting the pollution information message into a suitable telephone signal, and wherein the intermediary communication system is a portion of a public switched telephone network.

19. The method of claim 15, wherein communicating the pollution information message onto the intermediary communication system further comprises converting the pollution information message into a suitable Internet signal, and wherein the intermediary communication system is a portion of at least an Internet, a digital communication system and a public switched telephone network.

20. The method of claim 15, wherein the intermediary communication system further comprises a combination of portions of at least an Internet and a public switched telephone network.

21. The method of claim 15, wherein the intermediary communication system further comprises a combination of portions of at least an Internet and a digital communication system.

22. The method of claim 15, wherein the intermediary communication system further comprises a combination of portions of at least a digital communication system and a public switched telephone network.

23. The method of claim 14, further comprising receiving a signal from a detector configured to detect pollution such that generating the pollution information message is made in response to receiving the signal from the detector.

24. The method of claim 14, further comprising receiving a signal from a mobile detector configured to detect pollution such that generating the pollution information message and such that a location of the mobile detector is approximated by location information associated with the identification code of the transceiver.

* * * * *